(12) United States Patent
Bahrami et al.

(10) Patent No.: US 9,822,788 B2
(45) Date of Patent: Nov. 21, 2017

(54) VACUUM PUMP WITH BACK-UP BEARING CONTACT SENSOR

(71) Applicant: Edwards Limited, Crawley, West Sussex (GB)

(72) Inventors: Mohammad Eghtesadi Bahrami, Crawley (GB); Richard Glyn Horler, Crawley (GB)

(73) Assignee: Edwards Limited, Burgess Hill, West Sussex (GB)

( * ) Notice: Subject to any disclaimer, the term of this patent is extended or adjusted under 35 U.S.C. 154(b) by 249 days.

(21) Appl. No.: 14/438,148

(22) PCT Filed: Oct. 14, 2013

(86) PCT No.: PCT/GB2013/052672
§ 371 (c)(1),
(2) Date: Apr. 23, 2015

(87) PCT Pub. No.: WO2014/068276
PCT Pub. Date: May 8, 2014

(65) Prior Publication Data
US 2015/0292515 A1 Oct. 15, 2015

(30) Foreign Application Priority Data
Oct. 30, 2012 (GB) .................................. 1219517.8

(51) Int. Cl.
*F04D 29/056* (2006.01)
*F04D 29/058* (2006.01)
(Continued)

(52) U.S. Cl.
CPC ......... *F04D 29/058* (2013.01); *F04D 19/042* (2013.01); *F04D 19/048* (2013.01);
(Continued)

(58) Field of Classification Search
CPC .... F04D 29/049; F04D 29/056; F04D 29/058; F04D 19/042; F04D 19/48; F04D 15/0272
See application file for complete search history.

(56) References Cited

U.S. PATENT DOCUMENTS 3,071,323 A  1/1963  Chitayat
4,641,978 A * 2/1987 Kapich .................. F01D 25/16
310/90.5
(Continued)

FOREIGN PATENT DOCUMENTS

CN  1842655 A  10/2006
CN  1973134 A  5/2007
(Continued)

OTHER PUBLICATIONS

Office Action dated May 4, 2016 and Search Report dated Apr. 25, 2016 for corresponding Chinese Application No. 201380057294.5.
(Continued)

*Primary Examiner* — Ninh H Nguyen
(74) *Attorney, Agent, or Firm* — Westman, Champlin & Koehler, P.A.; Theodore M. Magee

(57) ABSTRACT

The present invention relates to a vacuum pump comprising a vacuum pumping mechanism comprising a rotor supported for rotation by a drive shaft, a first bearing assembly for controlling movement of the rotor during rotation of the drive shaft, a back-up bearing assembly for limiting said movement and a sensor for sensing when said movement is limited by the back-up bearing assembly.

14 Claims, 2 Drawing Sheets

(51) Int. Cl.

| | | |
|---|---|---|
| *F04D 19/04* | (2006.01) | |
| *F04D 27/00* | (2006.01) | |
| *F04D 29/059* | (2006.01) | |
| *F16C 19/52* | (2006.01) | |
| *F16C 32/04* | (2006.01) | |
| *F04D 29/053* | (2006.01) | |
| *F04D 29/26* | (2006.01) | |

(52) U.S. Cl.
CPC ......... *F04D 27/001* (2013.01); *F04D 29/053* (2013.01); *F04D 29/056* (2013.01); *F04D 29/059* (2013.01); *F04D 29/26* (2013.01); *F16C 19/52* (2013.01); *F16C 32/0444* (2013.01); *F16C 2233/00* (2013.01); *F16C 2360/45* (2013.01)

(56) References Cited

U.S. PATENT DOCUMENTS

| | | | |
|---|---|---|---|
| 5,059,092 A * | 10/1991 | Kabelitz | F04D 19/048 415/90 |
| 6,074,165 A * | 6/2000 | Casaro | F04D 19/048 310/90.5 |
| 6,524,005 B2 * | 2/2003 | Bridges | F16C 19/163 310/90.5 |
| 6,736,593 B2 | 5/2004 | Namiki et al. | |
| 7,736,062 B2 * | 6/2010 | Hagshenas | F16C 21/00 384/428 |
| 2003/0180162 A1 | 9/2003 | Beyer et al. | |
| 2005/0106043 A1 | 5/2005 | Casaro et al. | |
| 2011/0033317 A1 | 2/2011 | Greven et al. | |
| 2011/0103934 A1 | 5/2011 | Ohtachi et al. | |
| 2011/0176910 A1 | 7/2011 | Schroeder et al. | |
| 2012/0063918 A1 | 3/2012 | de Larminat et al. | |
| 2012/0209569 A1 | 8/2012 | Becourt et al. | |
| 2015/0204353 A1 | 7/2015 | Kogame | |
| 2015/0275902 A1 | 10/2015 | Patey et al. | |

FOREIGN PATENT DOCUMENTS

| | | |
|---|---|---|
| CN | 102011745 A | 4/2011 |
| CN | 201908851 U | 7/2011 |
| CN | 102155425 A | 8/2011 |
| CN | 102242722 | 11/2011 |
| EP | 0851127 A2 | 7/1998 |
| EP | 1895180 A2 | 3/2008 |
| EP | 2314877 A1 | 4/2011 |
| JP | H05157664 A | 6/1993 |
| JP | H0942290 A | 2/1997 |
| JP | 2003148386 A | 5/2003 |
| JP | 2006009759 A | 1/2006 |
| JP | 2006022914 A | 1/2006 |

OTHER PUBLICATIONS

British Search Report and Examination Report dated Feb. 26, 2013 for corresponding British Application No. GB1219517.8.
PCT International Notification of Transmittal of the International Search Report and Written Opinion of the International Search Authority, or the Declaration, PCT International Search Report and PCT International Written Opinion dated Jan. 23, 2014 for corresponding PCT Application No. PCT/GB2013/052672.
Prosecution history of corresponding Chinese Application No. CN201380057109.2 including: Office Action dated May 25, 2016 and Chinese Search Report dated May 17, 2016.
British Examination Report dated Feb. 27, 2013 and Search Report dated Feb. 26, 2013 for corresponding British Application No. GB1219518.6.
PCT International Search Report and Written Opinion dated Jan. 15, 2014 for corresponding PCT Application No. PCT/GB2013/052673.
British Examination Report dated Nov. 23, 2015 and Search Report dated Nov. 20, 2015 for corresponding British Application No. GB1509857.7.
Office Action dated May 2, 2017 for U.S. Appl. No. 14/438,140.

* cited by examiner

VACUUM PUMP WITH BACK-UP BEARING CONTACT SENSOR

CROSS-REFERENCE TO RELATED APPLICATION

This Application is a Section 371 National Stage Application of International Application No. PCT/GB2013/052672, filed Oct. 14, 2013, which is incorporated by reference in its entirety and published as WO 2014/068276 A1 on May 8, 2014 and which claims priority of British Application No. 1219517.8, filed Oct. 30, 2012.

FIELD OF THE INVENTION

The invention relates to a vacuum pump.

BACKGROUND

A vacuum pump may comprise a vacuum pumping mechanism comprising a rotor supported for rotation by a drive shaft, a first bearing assembly for controlling movement of the rotor away from its normal position during rotation of the drive shaft and a back-up bearing assembly for limiting said movement. Periodically, the vacuum pump requires maintenance and servicing to avoid low performance or failure.

The discussion above is merely provided for general background information and is not intended to be used as an aid in determining the scope of the claimed subject matter. The claimed subject matter is not limited to implementations that solve any or all disadvantages noted in the background.

SUMMARY

The present invention provides an improved vacuum pump.

The present invention provides a vacuum pump comprising a vacuum pumping mechanism comprising a rotor supported for rotation by a drive shaft, a first bearing assembly for controlling movement of the rotor during rotation of the drive shaft, a back-up bearing assembly for limiting said movement and a sensor for sensing when said movement is limited by the back-up bearing assembly.

The drive shaft movement may be movement generally in the radial direction.

The back-up bearing assembly may be arranged to limit said movement by contact with the rotor or the drive shaft, and the sensor is arranged to sense each contact event between the back-up bearing assembly and the rotor or the drive shaft.

The first bearing assembly may be a non-contact bearing assembly which controls said movement without contacting the rotor or the drive shaft.

The first bearing assembly may be a magnetic bearing assembly.

The first bearing assembly may be spaced from the rotor or the drive shaft by a distance which is greater than the distance which the back-up bearing assembly is spaced from the rotor or the drive shaft.

The sensor may be arranged to sense a force imparted to the rotor or drive shaft sufficient to cause the back-up bearing to limit said movement resulting from the force.

The sensor may be an accelerometer.

The sensor may be fixed relative to a pump housing.

The sensor may be arranged to output a signal to a counter for counting the number of events when the back-up bearing assembly limits said movement.

The pump may comprise an indicator for indicating to a user when the number of events exceeds a predetermined value predictive of a failure of the back-up bearing assembly. The indicator may be a display for displaying the number of events.

The indicator may comprise a transmitter for transmitting the number of events to a remote location by wired connection or by wireless connection.

The sensor may be arranged to sense a magnitude of a force imparted to the vacuum pump and associate the damage caused to the back-up bearing assembly dependent on the sensed magnitude.

The vacuum pump may comprise a turbo molecular vacuum pumping mechanism.

The Summary is provided to introduce a selection of concepts in a simplified form that are further described in the Detail Description. This summary is not intended to identify key features or essential features of the claimed subject matter, nor is it intended to be used as an aid in determining the scope of the claimed subject matter.

BRIEF DESCRIPTION OF THE DRAWINGS

In order that the invention may be well understood, an embodiment thereof, which is given by way of example only, will now be described with reference to the accompany drawings, in which.

DETAILED DESCRIPTION

Figure 1:
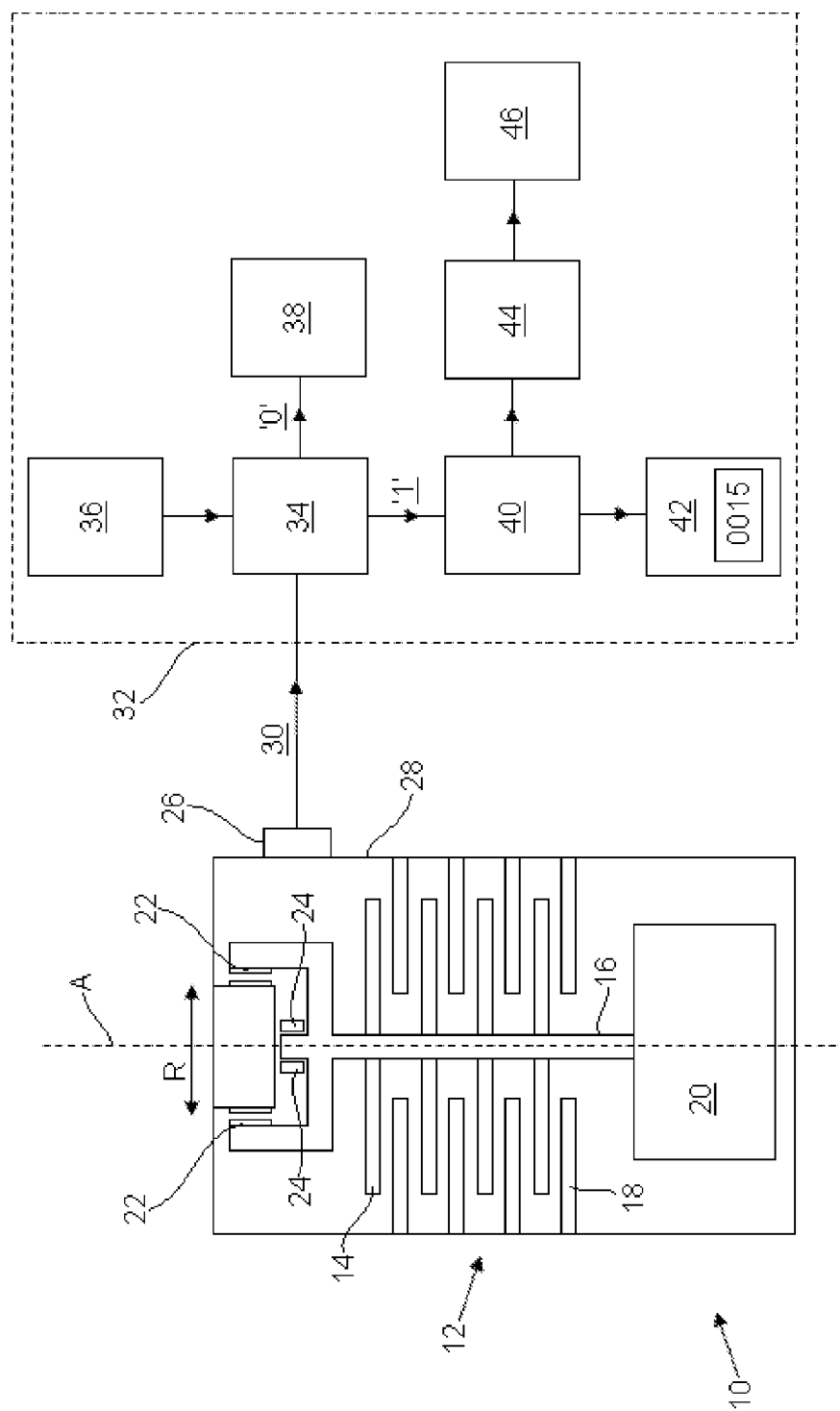
FIG. 1 shows a schematic representation of a vacuum pump.
Figure 3:
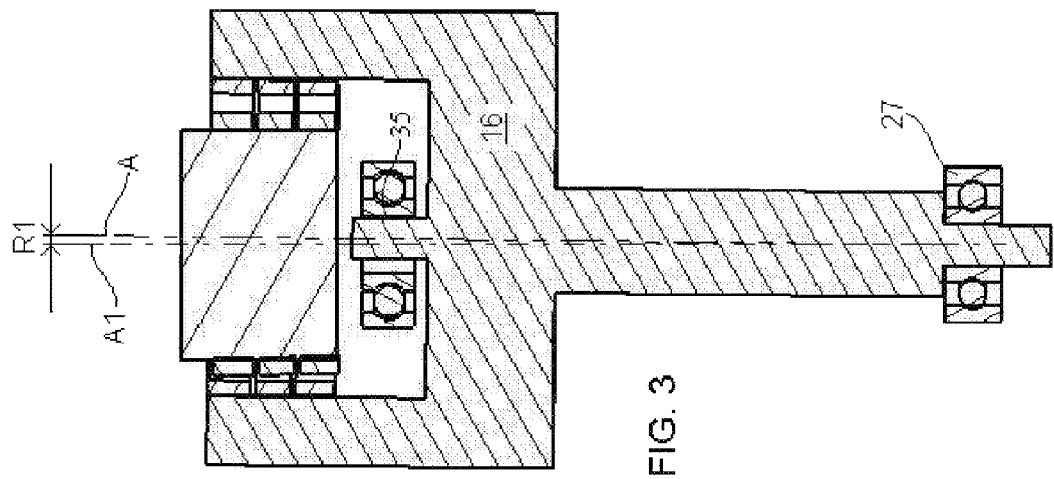
FIG. 3 shows the back-up bearing assembly limiting movement of a drive shaft of the vacuum pump.
Figure 2:
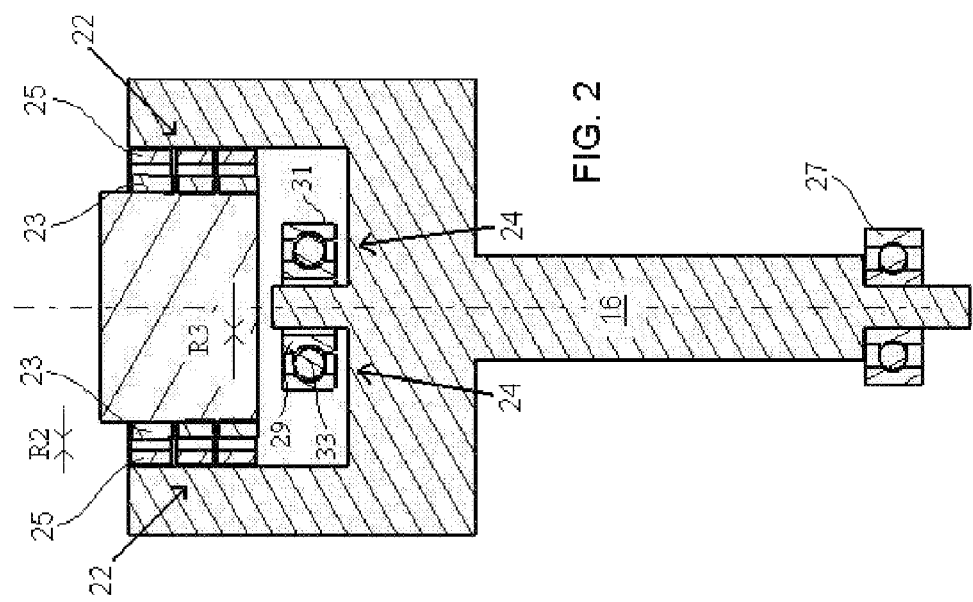
FIG. 2 shows the bearing assemblies of the vacuum pump in more detail.

Referring to FIGS. 1 to 3, a vacuum pump 10 is shown which comprises a vacuum pumping mechanism 12 which in the present case is a turbomolecular vacuum pumping mechanism although the pump may comprise other vacuum pumping mechanisms. The pumping mechanism comprises a rotor comprising four arrays of rotor blades 14 supported for rotation by a drive shaft 16. The rotor blades are rotated relative to respective arrays of stator blades 18. Any suitable number of stages may be provided. A motor 20 is arranged to drive the drive shaft.

A first bearing assembly 22 controls movement of the rotor and drive shaft in the direction R during rotation of the drive shaft about rotational axis A. Direction R is principally movement in the radial direction although it has a small element in the axial direction, since the drive shaft is angularly displaced about a lower bearing assembly 27 discussed in more detail below. In the embodiment shown the vacuum pumping mechanism is a turbomolecular pumping mechanism which is rotated at rotational speeds of between about 20,000 and 90,000 revolutions per minute, and in order to reduce friction between the first bearing assembly and the rotating parts of the pump, the first bearing assembly 22 is a non-contact bearing assembly which controls radial movement without contacting the rotor or the drive shaft. An example of a non-contact bearing is a magnetic bearing assembly in which opposite generally annular magnetic poles 23, 25 are located on the rotating part (connected to the shaft/rotor) and the fixed part (connected to the stator) respectively. In this example, movement of the rotating magnetic pole on the drive shaft towards the fixed magnetic pole causes an increased magnetic force to be applied to the rotating magnetic pole in a radial direction of the drive shaft thereby bringing the drive shaft back into correct alignment. This arrangement is low friction and therefore suitable for such high speed pumps, but as the bearing is non-contact it allows some radial movement of the rotor and the drive shaft, particularly if the vacuum pump receives an external impact or knock.

Movement of the drive shaft 16 is shown in the normal condition in FIG. 2 and in a displaced position in FIG. 3. A second bearing assembly 27 supports a lower end of the drive shaft and is fixed relative to the pump housing. When the vacuum pump is knocked, the axis A of the drive shaft is angularly displaced about the second bearing 27 to an axis A1. The angular displacement causes a radial displacement of R1 of the axes A and A1.

A back-up bearing assembly 24 limits radial movement of the rotor and drive shaft for example to prevent clashing between the rotating parts of the pump and the stationary parts of the pump. Clashing causes damage to the pumping mechanism and can be hazardous, particular as the rotor blades 14 are rotating at speeds of up to 90,000 rpm. The back-up bearing assembly 24 is arranged to limit radial movement by contact with the rotor or the drive shaft. One example of a back-up bearing assembly shown in FIGS. 2 and 3 comprises a rolling bearing mechanism having an inner race 29 facing radially inwardly towards a rotating part and a stationary outer race 31. Rolling members 33 such as ceramic balls are located between the races to allow relative rotational movement. As shown in FIG. 3, when a rotating part of the pumping mechanism moves radially by a determined distance it contacts the inner race 29 and causes relative rotation between the races until the rotating part returns to its normal operative position. Each such contact event causes the back-up bearing assembly to wear or become degraded and over time the back-up bearing requires replacement, since otherwise it may fail in use and damage the pumping mechanism. In this regard, the back-up bearing is typically located at the inlet of the vacuum pump and therefore is a dry bearing which is not lubricated to avoid contamination of a pumped gas stream with lubricant. If the back-up bearing assembly is not replaced and fails in use, the pump may be damaged and inoperative causing in turn damage to vacuum processing equipment or cancellation of procedures requiring a vacuum environment. Preferably therefore, the back-up bearing assembly is replaced or repaired by a safety margin in advance of failure.

As shown in FIGS. 1 to 3, the first bearing assembly is spaced from the rotor or the drive shaft by a distance R2 which is greater than the distance R3 which the back-up bearing assembly is spaced from the rotor or the drive shaft. This arrangement prevents damage being caused to the first bearing assembly when the drive shaft or rotor is displaced because the back-up bearing assembly makes contact with the rotor or drive shaft first at point 35 shown in FIG. 3 and prevents further displacement towards the first bearing assembly.

A force may be imparted to the vacuum pump if it is knocked, for example, by a user while in use or when it is being installed or transported. In some vacuum pumping applications, the vacuum pump is required to be easily transported from one location to another, for example, within devices such as accelerators for cancer treatment in different locations in a hospital. It is convenient therefore to mount the vacuum pump on a transporter such as a trolley or other mobile, or wheeled, unit, however transporting the vacuum pump in this way renders it more susceptible to knocks due to accidental collisions or transport over uneven surfaces. The force required to bring the back-up bearing into use varies dependent on characteristics of the vacuum pump, for example the controlling magnetic force which can be generated by the first bearing assembly. A typical force which is sufficient to cause operation of the back-up bearing assembly is 10 to 100 N applied to the vacuum pump generally in the radial and/or axial direction.

A sensor 26 is arranged for sensing when radial movement of the rotor or drive shaft is limited by the back-up bearing assembly. In the arrangement shown, the sensor is fixed relative to a pump housing 28, for example, to an outer surface of the pump housing and senses the force applied to the pump housing. The sensor may be an accelerometer for sensing acceleration of the pump housing resulting from the applied force. It is determined prior to operation that an acceleration of 'x' meters per second per second causes implementation of the back-up bearing assembly and therefore a contact event is determined to have occurred when the sensor senses an acceleration equal to or greater than 'x'.

In other arrangements the sensor may comprise means for detecting contact between the rotor or drive shaft and the back-up bearing assembly. One such arrangement may comprise an electrical circuit which is closed on contact. Another arrangement may comprise a proximity switch. Yet another arrangement may comprise means for detecting relative movement of the inner and outer races of the back-up bearing assembly. All sensor arrangements for determining the occurrence of a contact event are included within the scope of the present invention.

The accelerometer arrangement may be preferred in some embodiments because it is capable of sensing a magnitude of an impact in addition to sensing an impact per se. If a sensor is arranged to sense a magnitude of a force imparted to the vacuum pump, the sensed magnitude can be associated with the damage caused to the back-up bearing assembly. For example, a back-up bearing assembly may fail after 500 stronger impacts or 1000 weaker impacts. As explained in more detail below, replacement of a back-up bearing assembly is triggered when the number of sensed impacts exceeds a predetermined value, for example 10,000 impacts. A strong impact may be equivalent to 2 weaker impacts in the example above and therefore if a strong impact is sensed the total number of impacts is increased by two even though only a single impact has been sensed. The arrangement may have two values representative of strong or weak impacts and add one to the count if a weak impact is sensed or two to the count if a strong impact is sensed. The strength of impacts could of course be divided into more than two different strengths for greater accuracy.

In another arrangement, the total aggregate force applied to the vacuum pump can be measured or the total acceleration experienced by the vacuum pump. For example, if an impact with a force of 50 N causes a single impact and 10,000 such impacts means that replacement of the back-up bearing is necessary, the total force applied to the vacuum pump is 500,000 N. Accordingly, when the total sensed force exceeds 500,000 N replacement is triggered.

Referring particularly to FIG. 1, the sensor is arranged to output a signal 30 corresponding with the detection of a contact event, the force applied to the vacuum pump or the acceleration experienced. The sensor signal 30 is output to a processor 32 configured to process the output. In the arrangement shown, the processor comprises a comparator 34 for comparing the acceleration sensed by the accelerometer with a value stored in a store 36 and outputting binary '1' if the acceleration is greater than the stored value or outputting binary '0' if the acceleration is less than the stored value. There may be more than one stored value representative of strong and weak impacts. A binary '0' is a determination that no contact has occurred and therefore the reading is disposed at step 38. A binary '1' is output to a counter 40 for counting the number of events when the back-up bearing assembly limits radial movement of the rotor or drive shaft. The counter reading may be displayed on a display 42 for reading by a user. As shown, the display is displaying 15 events. The user can be supplied with a value above which replacement of the back-up bearing assembly is required so that when the display displays for example 1000 events or 5000 events, the user must request pump maintenance. Alternatively, the count may be output to a comparator 44 for comparing the count with a value for the maximum number of events permitted. A positive comparison is output to a unit 46 for generating a warning indication, for example, an audible or visible warning. The unit 46 may comprise a transmitter for transmitting a warning indication to a pump supplier located remote from the vacuum pump by wired or wireless connection who can determine a requirement for pump maintenance.

Although the subject matter has been described in language specific to structural features and/or methodological acts, it is to be understood that the subject matter defined in the appended claims is not necessarily limited to the specific features or acts described above. Rather, the specific features and acts described above are described as example forms of implementing the claims.

The invention claimed is:

1. A vacuum pump comprising a vacuum pumping mechanism comprising a rotor supported for rotation by a drive shaft, a first bearing assembly for controlling movement of the rotor during rotation of the drive shaft, a back-up bearing assembly for limiting said movement and a sensor for sensing when said movement is limited by the back-up bearing assembly wherein the sensor is arranged to output a signal to a counter for counting the number of events when the back-up bearing assembly has limited said movement.

2. The vacuum pump as claimed in claim 1, wherein movement of the drive shaft is generally in the radial direction relative to the axis of the drive shaft.

3. The vacuum pump as claimed in claim 1, wherein the back-up bearing assembly is arranged to limit said movement by contact with the rotor or the drive shaft, and the sensor is arranged to sense each contact event between the back-up bearing assembly and the rotor or the drive shaft.

4. The vacuum pump as claimed in claim 1, wherein the first bearing assembly is a non-contact bearing assembly which controls said movement without contacting the rotor or the drive shaft.

5. The vacuum pump as claimed in claim 4, wherein the first bearing assembly is a magnetic bearing assembly.

6. The vacuum pump as claimed in claim 1, wherein the first bearing assembly is spaced from the rotor or the drive shaft by a distance which is greater than the distance which the back-up bearing assembly is spaced from the rotor or the drive shaft.

7. The vacuum pump as claimed in claim 1, wherein the sensor is arranged to sense a force imparted to the rotor or drive shaft sufficient to cause the back-up bearing to limit said movement resulting from the force.

8. The vacuum pump as claimed in claim 7, wherein the sensor is an accelerometer.

9. The vacuum pump as claimed in claim 1, wherein the sensor is fixed relative to a pump housing.

10. The vacuum pump as claimed in claim 1, comprising an indicator for indicating to a user when the number of events exceeds a predetermined value predictive of a failure of the back-up bearing assembly.

11. The vacuum pump as claimed in claim 10, wherein the indicator is a display for displaying the number of events.

12. The vacuum pump as claimed in claim 1, wherein the indicator comprises a transmitter for transmitting the number of events to a remote location by wired or wireless connection.

13. The vacuum pump as claimed in claim 1, comprising a turbo molecular vacuum pumping mechanism.

14. A vacuum pump comprising a vacuum pumping mechanism comprising a rotor supported for rotation by a drive shaft, a first bearing assembly for controlling movement of the rotor during rotation of the drive shaft, a back-up bearing assembly for limiting said movement and a sensor for sensing when said movement is limited by the back-up bearing assembly wherein the sensor is arranged to output a sensed magnitude of force applied to the vacuum pump and the vacuum pump further aggregates a plurality of sensed magnitudes of force applied to the vacuum pump to form a total magnitude of force applied to the vacuum pump over time.

* * * * *